United States Patent [19]

Yoshikawa

[11] Patent Number: 5,221,057
[45] Date of Patent: Jun. 22, 1993

[54] SPINNING REEL WITH ONE-WAY CLUTCH MECHANISM

[75] Inventor: Osamu Yoshikawa, Sakai, Japan

[73] Assignee: Shimano, Inc., Osaka, Japan

[21] Appl. No.: 791,543

[22] Filed: Nov. 14, 1991

[30] Foreign Application Priority Data

Nov. 20, 1990 [JP] Japan .................. 2-122195[U]

[51] Int. Cl.⁵ .................. A01K 89/01; A01K 89/02
[52] U.S. Cl. .................. 242/247; 242/299; 188/82.84
[58] Field of Search .............. 242/247, 248, 285, 297, 242/298, 299; 188/82.3, 82.4, 82.84, 30, 61

[56] References Cited

U.S. PATENT DOCUMENTS

| 2,019,190 | 10/1935 | Mersereau | 188/82.3 |
|---|---|---|---|
| 2,604,273 | 7/1952 | Hayes | 188/82.3 X |
| 4,477,038 | 10/1984 | Yorikane | 242/299 X |
| 4,529,142 | 7/1985 | Yoshikawa | 242/243 |
| 4,614,314 | 9/1986 | Ban | 242/248 |
| 4,718,617 | 1/1988 | Vadasz et al. | 242/243 |
| 5,020,738 | 6/1991 | Yamaguchi | 242/247 |

FOREIGN PATENT DOCUMENTS 63-64 5/1988 Japan .

*Primary Examiner*—Joseph J. Hail, III
*Attorney, Agent, or Firm*—Dickstein, Shapiro & Morin

[57] ABSTRACT

A spinning reel comprising a rotor for taking up a fishing line, a one-way clutch mechanism having an outer ring member attached to inner peripheries of the rotor through a torque transmission structure, and an inner ring member, and a changeover mechanism. The changeover mechanism is switchable between a position in which to restrain rotation of the inner ring member of the one-way clutch mechanism thereby to allow the rotor to rotate only in a fishing line winding direction by restraining rotation of an inner ring member of the one-way clutch mechanism, and a position in which to permit free rotation of the inner ring member thereby to allow the rotor to rotate in opposite directions.

6 Claims, 3 Drawing Sheets

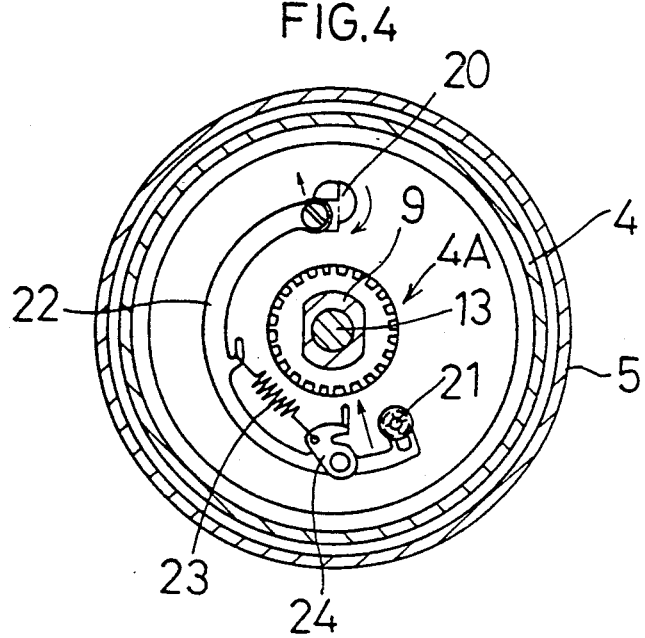
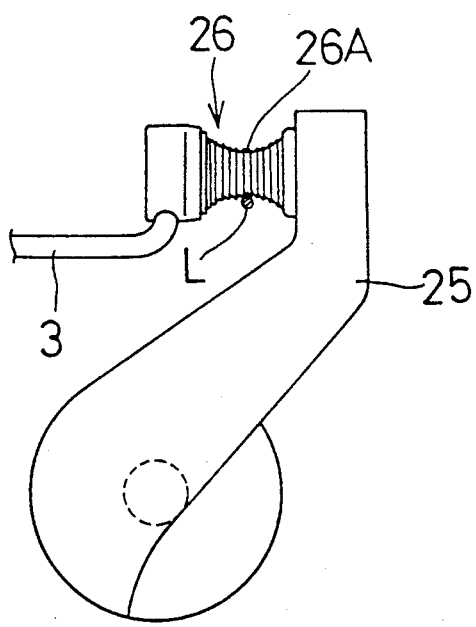
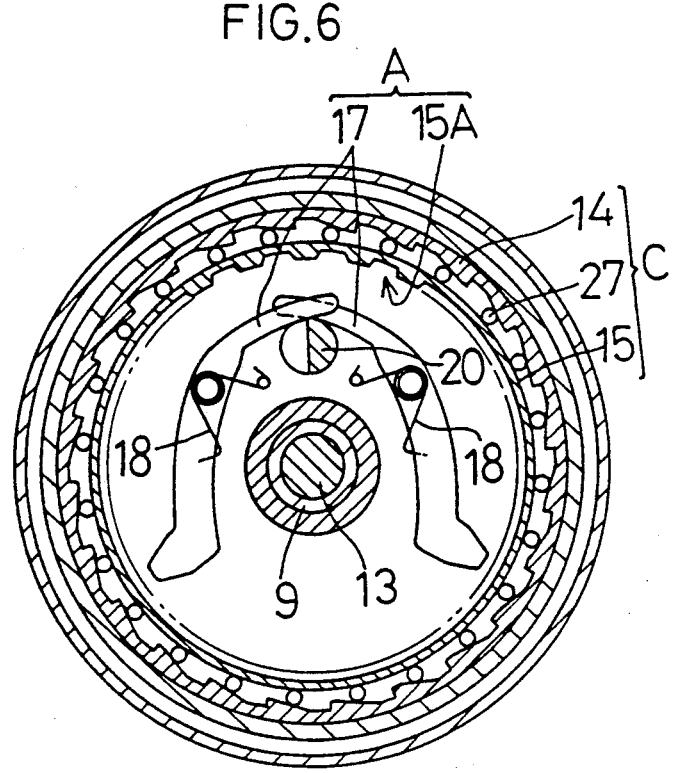

SPINNING REEL WITH ONE-WAY CLUTCH MECHANISM

BACKGROUND OF THE INVENTION

1. Field of the Invention

The present invention relates to a spinning reel, and more particularly to a technique for locking a rotor for taking up a fishing line against rotation in a fishing line feeding direction.

2. Description of the Related Art

An example of the conventional spinning reels as noted above is disclosed in Japanese Utility Model Publication No. 63-64 which includes a ratchet wheel attached to a transmission shaft rotatable in unison with a rotor, and a ratchet pawl operable between two positions engageable with and disengageable from the ratchet wheel. This type of spinning reel further includes a sound arrester for moving the ratchet pawl away from the ratchet wheel when the rotor is rotated in a fishing line winding direction.

While this conventional structure is advantageous in that such a noise as offensive to the ear is not generated by contact between the ratchet wheel and the ratchet pawl when the fishing line is taken up, it is disadvantageous in that there exists "play" between the ratchet wheel and the ratchet pawl. As a result, when a fish bites and the angler fights with the fish, there occurs a problem that it takes a long time for the rotor to be locked against rotation due to a stroke of this "play", which makes it difficult to quickly enter a fighting operation.

SUMMARY OF THE INVENTION

A primary object of the present invention is to provide an improved spinning reel which does not produce any noise offensive to the ear, and allows the angler to quickly enter a fighting operation with the fish with the rotor being prevented from rotating in a fishing line feeding direction.

In order to fulfill the above-noted object, the present invention is characterized by a spinning reel comprising a rotor for taking up a fishing line, a rolling-type one-way clutch mechanism having an outer ring member attached to inner peripheries of the rotor through a torque transmission structure, and an inner ring member, and a changeover mechanism switchable between a position in which to restrain rotation of the inner ring member of the one-way clutch mechanism thereby to allow the rotor to rotate only in a fishing line winding direction by restraining rotation of an inner ring member of the one-way clutch mechanism, and a position in which to permit free rotation of the inner ring member thereby to allow the rotor to rotate in opposite directions.

This structure has the following functions and effects.

As shown in FIGS. 1 and 2, the one-way clutch mechanism C is arranged in a position sufficiently spaced from an axis of rotation of the rotor 4. As compared with the structure in which the clutch mechanism is arranged adjacent the axis of rotation, the time required to prevent rotation of the rotor 4 during the fight with the fish is reduced even if the mechanism defining "play" having the same stroke is employed.

The rolling-type one-way clutch mechanism C has a structure as shown in FIG. 2, a detailed operation is disclosed in Japanese Patent Publication No. 42-7523, 46-21126 or the like, or as shown in FIG. 6. With this type, any noise is not produced when the rotor rotates in the winding direction even if any sound arrester is not provided as in the conventional structure noted above. In addition, the whole rolling elements such as rollers 16 prevent rotation of the rotor, as a result of which the mechanism is durable against a great force applied when preventing rotation of the rotor.

Thus, the present invention can provide an improved spinning reel which does not produce any sounds offensive to the ear when the fishing line is taken up and allows a quick fight operation with a fish, and at the same time allows the angler to forcibly draw the fish even when the fish strongly pulls.

BRIEF DESCRIPTION OF THE DRAWINGS

The drawings illustrate a spinning reel embodying the present invention, in which:

FIG. 4 is a front view of a mechanism for producing a click sound;

FIG. 5 is a plan view of a line roller; and

FIG. 6 is a vertical section of the arrangement of the one-way clutch mechanism in front view according to another embodiment.

DETAILED DESCRIPTION OF THE PREFERRED EMBODIMENTS

Figure 1:
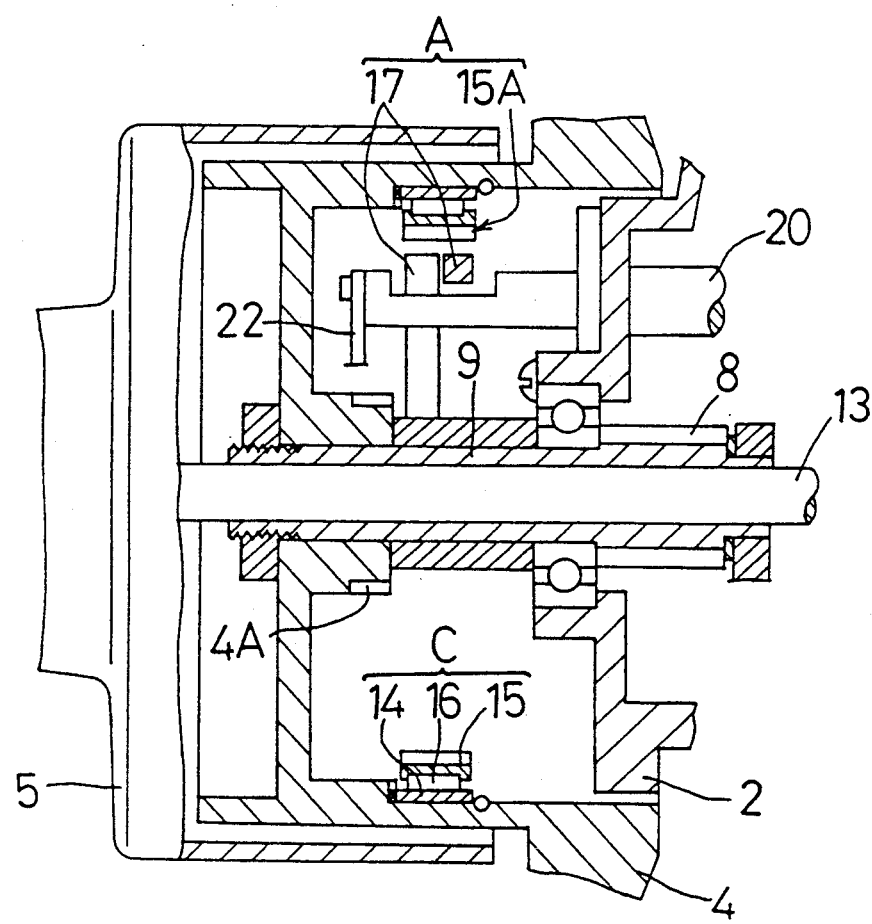
FIG. 1 is a vertical section of an arrangement of a one-way clutch mechanism in side view.

The present invention will be described in detail hereinafter referring to the drawings.

Figure 3:
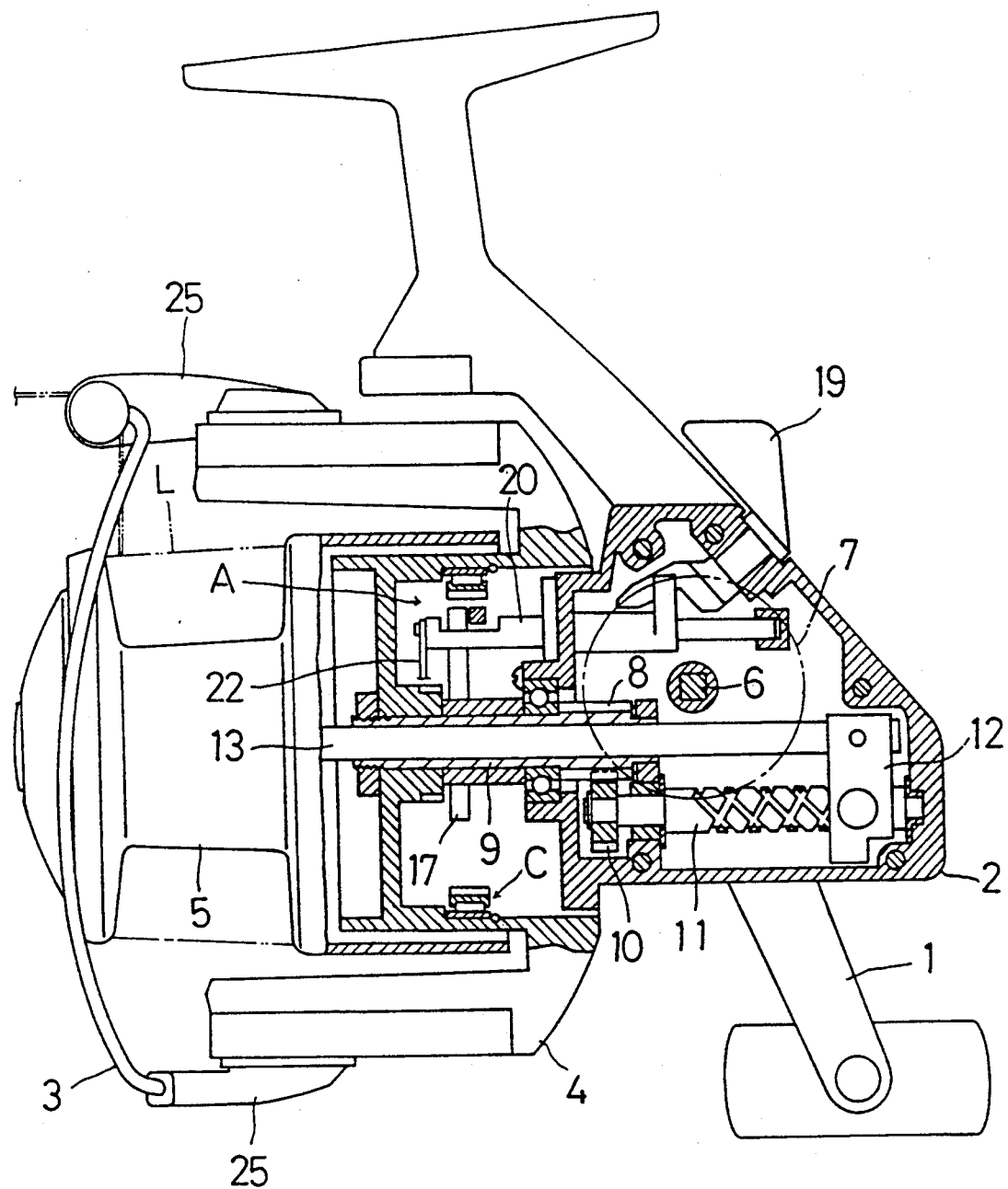
FIG. 3 is a partially broken side view of the spinning reel.

FIG. 3 shows a spinning reel according to the present invention comprising a reel body 2 having a handle 1, a rotor 4 having a bail arm 3 and a spool 5 for taking up a fishing line L. The rotor 4 and the spool 5 are mounted forwardly of the reel body 2. The spinning reel further comprises a take-up transmission mechanism for transmitting a rotational force of a handle shaft 6 to the rotor 4 through a drive gear 7, a pinion gear 8 and a sleeve shaft 9, and an oscillating mechanism for converting drive from the pinion gear 9 to reciprocative movement through an input gear 10, a traverse shaft 11 and a slidable element 12 to transmit the movement to a spool shaft 13.

A roller-bearing type one-way clutch mechanism C is provided in inner peripheries of a skirt of the rotor for preventing the rotor 4 from being rotated in a fishing line feeding direction.

Figure 2:
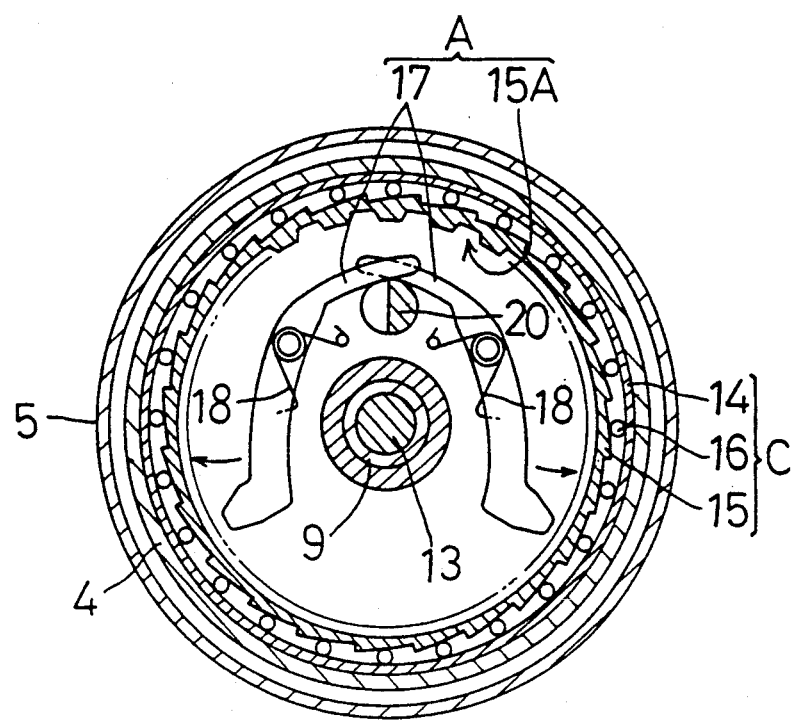
FIG. 2 is a vertical section of the arrangement of the one-way clutch mechanism in front view.

As shown in FIGS. 1 and 2, the one-way clutch mechanism C includes an outer ring member 14 rotatable in unison with the rotor 4, an inner ring member 15 defining a plurality of engaged recesses 15A therein, and a plurality of rollers 16 disposed between the outer and inner ring members. A pair of engaging elements 17 engageable with the recesses 15A are pivotably supported at a front portion of the reel body to be urged in an engaging direction by springs 18.

Each engaging element 17 is also operable to a disengaged position through a control shaft 20 operatively connected to a changeover control lever 19 attached to the reel body 2. The engaging element 17 maintained in an engaged position allows the rotor 4 to rotate only in a fishing line winding direction, while the engaging element 17 in the disengaged position allows the rotor 4 to rotate in opposite directions.

The combination of the recesses 15A, the engaging elements 17 and the changeover control structure is referred to as a changeover mechanism A.

Referring to FIG. 4, this reel further comprises a mechanism for producing a click sound when the rotor 4 rotates in the fishing line winding direction with the rotation of the rotor 4 being permitted only in the winding direction by the changeover mechanism A. The click sound producing mechanism is pivotably supported by the control shaft 20 and includes a frame 22 engaged with a guide element 21, a sound producing piece 24 supported by the frame 22 and urged to a predetermined position through a spring 23, and a gear-like element 4A defined in the rotor 4 for engaging and disengaging the sound producing piece 24.

The bail arm 3 is supported by pivotal arms 25. A guide roller 26 is mounted on one of the pivotal arms 25 and defines numeral grooves 26A for restraining the fishing line from rolling in an axial direction of the guide roller 26 thereby to prevent twist of the fishing line L.

Another embodiment will be described below.

Apart from the foregoing embodiment, the changeover mechanism may be practiced in various ways, e.g. so as to lock the inner ring member against rotation under a friction force, for example.

As shown in FIG. 6, the present invention may employ a one-way clutch mechanism C including balls 27 instead of the rollers 16 disposed between the outer ring member 14 and the inner ring member 15 defining the plurality of the engaged recesses 15A.

Although the present invention has been described referring to only the preferred embodiments, it would be apparent that any modifications and changes are possible within the scope of the appended claims.

What is claimed is:

1. A spinning reel comprising:
   a reel body;
   a spool provided on said reel body, said spool being non-rotatable with respect to said reel body;
   a rotor for winding a fishing line on said spool, said rotor having an inner wall;
   a one-way clutch mechanism including:
      an outer race provided on said inner wall of said rotor, said outer race being non-rotatable with respect to said rotor,
      an inner race provided inwardly of said outer race, said inner race being rotatable with respect to said outer race and said reel body, said inner race having a plurality of radially inwardly directed recesses, and
      a plurality of freely rotatable bodies for allowing rotation of said outer race in a line winding direction and for prohibiting rotation of said outer race in a line unwinding direction, said bodies being located between said outer race and said inner race;
   an engaging piece pivotably provided on said reel body in a space surrounded by said inner race, said engaging piece having a first position and a second position, and a biasing means for always biasing said engaging piece toward said first position, wherein said engaging piece engages one of said recesses and thereby prohibits rotation of said inner race with respect to said reel body when said engaging piece is in said first position, and wherein said engaging piece is disengaged from said recesses to allow rotation of said inner race when said engaging piece is in said second position; and
   a switching lever for switching said engaging piece to said second position by overcoming a biasing force of said biasing means, said switching lever being provided outwardly of said reel body.

2. A spinning reel as claimed in claim 1, wherein said inner race includes a plurality of inclined faces on an outwardly circumferential surface.

3. A spinning wheel as claimed in claim 1, wherein said outer race includes a plurality of inclined faces on an inwardly circumferential surface.

4. A spinning reel as claimed in claim 1, wherein said plurality of freely rotatable bodies are rollers.

5. A spinning reel as claimed in claim 1, wherein said plurality of freely rotatable bodies are balls.

6. A spinning reel comprising:
   a reel body;
   a spool provided on said reel body, said spool being non-rotatable with respect to said reel body;
   a rotor for winding a fishing line on said spool, said rotor having an inner periphery;
   a one-way clutch mechanism including:
      an outer race fixed on said inner periphery of said rotor, said outer race being non-rotatable with respect to said rotor,
      an inner race provided inwardly of said outer race, said inner race being rotatable with respect to said outer race and said reel body, and
      a plurality of freely rotatable bodies inserted between said outer race and said inner race;
      an engaging piece pivotably provided on said reel body in a space surrounded by said inner race, said engaging piece having a first position and a second position, wherein said engaging piece engages said inner race and thereby prohibits rotation of said inner race with respect to said reel body when said engaging piece is in said first position, and wherein said engaging piece is disengaged from said inner race to allow rotation of said inner race when said engaging piece is in said second position;
   a switching lever for switching said engaging piece between said first position and said second position, said switching lever being provided outwardly of said reel body, said switching lever being operatively connected to said engaging piece;
   whereby said engaging piece allows said rotor to rotate in a line winding direction and prohibits said rotor from rotating in a line unwinding direction when said engaging piece is in said first position, and said engaging piece allows said rotor to rotate in both said winding and said unwinding directions when said engaging piece is in said second position.

* * * * *